US009693026B2

(12) United States Patent
Tomikawa et al.

(10) Patent No.: US 9,693,026 B2
(45) Date of Patent: Jun. 27, 2017

(54) PROJECTION TYPE DISPLAY APPARATUS AND LIGHTING DEVICE

(71) Applicant: Seiko Epson Corporation, Tokyo (JP)

(72) Inventors: Naoki Tomikawa, Fujimi-machi (JP); Takenori Hirota, Chiba (JP); Ryuichi Kurosawa, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 91 days.

(21) Appl. No.: 14/593,052

(22) Filed: Jan. 9, 2015

(65) Prior Publication Data

US 2015/0201172 A1    Jul. 16, 2015

(30) Foreign Application Priority Data

Jan. 15, 2014  (JP) ................. 2014-004893

(51) Int. Cl.
| | |
|---|---|
| *G02F 1/1335* | (2006.01) |
| *H04N 9/31* | (2006.01) |
| *F21V 9/06* | (2006.01) |
| *G02B 27/10* | (2006.01) |
| *G03B 21/00* | (2006.01) |
| *G03B 21/14* | (2006.01) |
| *G02B 5/28* | (2006.01) |
| *H04N 5/74* | (2006.01) |
| *G02B 5/20* | (2006.01) |

(52) U.S. Cl.
CPC .............. *H04N 9/3158* (2013.01); *F21V 9/06* (2013.01); *G02B 27/102* (2013.01); *G03B 21/006* (2013.01); *G03B 21/14* (2013.01); *H04N 9/3144* (2013.01); *G02B 5/208* (2013.01); *G02B 5/283* (2013.01); *H04N 5/7441* (2013.01)

(58) Field of Classification Search
CPC .............................. G03B 21/006; G03B 21/14
See application file for complete search history.

(56) References Cited

U.S. PATENT DOCUMENTS

| 5,696,564 A | 12/1997 | Hatakeyama |
| 6,111,700 A | 8/2000 | Kobayashi et al. |
| 2002/0195942 A1* | 12/2002 | Hayashi .................. H01J 61/40 313/635 |
| 2004/0114114 A1 | 6/2004 | Yano et al. |

(Continued)

FOREIGN PATENT DOCUMENTS

| JP | 08-314012 A | 11/1996 |
| JP | 11-014944 A | 1/1999 |

(Continued)

OTHER PUBLICATIONS

Machine-translated JP2007-212733A; Takahashi, Aug. 23, 2007.*

*Primary Examiner* — Wen-Ying P Chen
(74) *Attorney, Agent, or Firm* — ALG Intellectual Property, LLC

(57) ABSTRACT

In a projection type display apparatus, a lighting device includes two reflection type cutoff filters (first cutoff filter and reflective second cutoff filter) which block out ultraviolet range light on an output optical path from a light source. A cut on wavelength of the second cutoff filter on the front side is longer than that of the first cutoff filter on the rear side. The two cutoff filters are formed on planar-shaped first faces of a first integrator lens and a second integrator lens. For this reason, both input faces of the two cutoff filters are orthogonal to an apparatus optical axis.

9 Claims, 4 Drawing Sheets

(56) References Cited

U.S. PATENT DOCUMENTS

| | | | |
|---|---|---|---|
| 2005/0012870 A1 | 1/2005 | Hirata et al. | |
| 2006/0221475 A1 | 10/2006 | Liu | |
| 2010/0026918 A1* | 2/2010 | Nakagawa | G02B 5/3083 |
| | | | 349/5 |
| 2011/0115992 A1* | 5/2011 | Maeda | G03B 21/16 |
| | | | 349/5 |

FOREIGN PATENT DOCUMENTS

| | | |
|---|---|---|
| JP | 2001-264729 A | 6/2001 |
| JP | 2002-072183 A | 3/2002 |
| JP | 2003-084364 A | 3/2003 |
| JP | 2003-107242 A | 4/2003 |
| JP | 2005-031435 A | 2/2005 |
| JP | 2005-037564 A | 2/2005 |
| JP | 2005-070476 A | 3/2005 |
| JP | 2005-338579 A | 12/2005 |
| JP | 2006-285214 A | 10/2006 |
| JP | 2007-212733 A | 8/2007 |

* cited by examiner

PROJECTION TYPE DISPLAY APPARATUS AND LIGHTING DEVICE

BACKGROUND

1. Technical Field

The present invention relates to a projection type display apparatus using a liquid crystal panel, and a lighting device which is used in the projection type display apparatus.

2. Related Art

In a projection type display apparatus, light which is output from a lighting device is modulated using a liquid crystal panel, and is projected from a projection optical system thereafter. Here, when an extra-high pressure mercury lamp or the like is used in a light source of the lighting device, a lot of ultraviolet range light beams are included in white light which is output from the light source, and when the ultraviolet range light is input to the liquid crystal panel, a liquid crystal material deteriorates.

On the other hand, in the projection type display apparatus, a reflection type cutoff filter, a reflection type cutoff filter of which a cut-on wavelength is a longer than that of the cutoff filter, and an absorption type cutoff filter are arranged in order between the light source and a polarizing conversion element in order to prevent the polarizing conversion element from being deteriorated due to the ultraviolet range light, and a technology of blocking out the ultraviolet range light using the cutoff filter has been suggested (refer to JP-A-2007-212733).

In the technology which is described in JPA-2007-212733, between two reflection type cutoff filters, a cut on wavelength of a cutoff filter on the liquid crystal panel side is longer than that of a cutoff filter on the light source side, and therefore, a lot of ultraviolet range light beams also reach the cutoff filter on the liquid crystal panel side. For this reason, there is a problem in that heat generation in the cutoff filter on the liquid crystal panel side influences the liquid crystal panel.

SUMMARY

An advantage of some aspects of the invention is to provide a projection type display apparatus which can appropriately block out ultraviolet range light included in light which is output from a light source using a cutoff filter, and a lighting device which is used in the projection type display apparatus, or the like.

According to an aspect of the invention, there is provided a projection type display apparatus which includes a light source; a liquid crystal panel which includes a liquid crystal layer between a first substrate and a second substrate, and modulates light which is output from the light source; a projection optical system which projects the modulated light which is output from the liquid crystal panel; a first cutoff filter which reflects ultraviolet range light which is arranged between the light source and the liquid crystal panel; and a second cutoff filter which reflects the ultraviolet range light which is arranged between the light source and the first cutoff filter, and is located at a side on which a cut on wavelength is longer than that of the first cutoff filter.

In the aspect of the invention, ultraviolet range light of light which is output from a light source is blocked out using the first cutoff filter and the second cutoff filter, and is supplied to a liquid crystal panel thereafter. For this reason, it is possible to prevent a liquid crystal layer from being deteriorated due to the ultraviolet range light. Here, cut on wavelengths of the first cutoff filter and the second cutoff filter are different from each other. For this reason, it is possible to sufficiently block off ultraviolet range light without remarkably decreasing transmissivity in a short wavelength range of visible light. In addition, both the first cutoff filter and second cutoff filter are reflection type cutoff filters, and it is possible to suppress heat generation in the cutoff filter to be low compared to a case in which an absorption type cutoff filter is used. In addition, since both of the first cutoff filter and second cutoff filter are reflection type cutoff filters, in a dielectric multilayered film which configures two cutoff filters, it is possible to adopt a configuration in which a basic layer configuration is the same, and only the film thickness of each layer is different. Accordingly, in the first cutoff filter and the second cutoff filter, transmission spectra in a wide wavelength range approximately match. Accordingly, since a spectrum of visible light which reaches the liquid crystal panel is not remarkably changed compared to a case in which one cutoff filter is used, it is possible to obtain good contrast over a wide wavelength range. In addition, between two reflection type cutoff filters, since a cut on wavelength of the second cutoff filter on the front side (light source side) is longer than that of the first cutoff filter on the rear side (liquid crystal panel side), a lot of ultraviolet range light beams do not reach the first cutoff filter on the rear side. For this reason, there is an advantage that heat generation in the first cutoff filter on the rear side does not influence the liquid crystal panel or an optical element which is arranged in the vicinity thereof.

In the projection type display apparatus, an input face of at least one of the first cutoff filter and the second cutoff filter may be orthogonal to an apparatus optical axis which reaches the liquid crystal panel from the light source. According to the configuration, even in a case in which a reflection type cutoff filter is used as the cutoff filter, an input angle hardly influences on a cutoff property.

In the projection type display apparatus, at least one of the first cutoff filter and the second cutoff filter may be provided with an optical element on the input face side or an output face side. According to the configuration, even in a case in which the reflection type cutoff filter is used as the cutoff filter, the input angle hardly influences on a cutoff property. In addition, since it is a configuration in which the cutoff filter is added to the optical element, the number of optical elements is not increased even when the cutoff filter is provided. In addition, since unnecessary interface reflection is reduced by the number of optical elements which is not increased, it is possible to cause light from the light source to reach the liquid crystal panel efficiently.

In the projection type display apparatus, the optical element may have a curved face.

In the projection type display apparatus, transmissivity of the first cutoff filter may be equal to or greater than 90% when light with a wavelength of which transmissivity of the second cutoff filter is 10% is radiated to the first cutoff filter. According to the configuration, an influence of visible range light on a spectrum is small.

In the projection type display apparatus, transmissivity of the second cutoff filter may be equal to or less than 0.1% when light with a cut on wavelength of which transmissivity of the first cutoff filter is 50% is radiated to the second cutoff filter. According to the configuration, it is possible to set transmissivity of equal to or less than 0.05% to light of which a wavelength is lower than that of a cut on wavelength of the second cutoff filter.

In the projection type display apparatus, the liquid crystal panel may include a first inorganic alignment film which is formed on a liquid crystal panel side of the first substrate, and a second inorganic alignment film which is formed on a liquid crystal panel side of the second substrate. According to the configuration, it is possible to suppress deterioration of the alignment film due to ultraviolet range light, compared to a case in which an organic alignment film is used.

In the projection type display apparatus, the first cutoff filter and the second cutoff filter may be formed of dielectric multilayered films.

According to another aspect of the invention, there is provided a lighting device which includes a light source; a first cutoff filter which reflects ultraviolet light which is arranged on an output optical path from the light source; and a second cutoff filter which reflects the ultraviolet range light which is arranged between the light source and the first cutoff filter, and is located at a side at which a cut on wavelength is longer than that of the first cutoff filter.

According to the aspect of the invention, in light which is output from the light source, ultraviolet-region light is blocked out due to the first and the second cutoff filters. Here, cut on wavelengths of the first and second cutoff filters are different from each other. For this reason, it is possible to sufficiently block out the ultraviolet range light without remarkably decreasing transmissivity of the ultraviolet range light. In addition, since both of the first and second cutoff filters are reflection type cutoff filters, it is possible to suppress heat generation in the cutoff filter to be low compared to a case in which an absorption type cutoff filter is used. In addition, since both of the first cutoff filter and second cutoff filter are reflection type cutoff filters, in a dielectric multilayered film which configures two cutoff filters, it is possible to adopt a configuration in which a basic layer configuration is the same, and only the film thickness of each layer is different. Accordingly, in the first cutoff filter and the second cutoff filter, transmission spectra in a wide wavelength range approximately match. Accordingly, a spectrum of visible range light which is output from the lighting device is not remarkably changed compared to a case in which one cutoff filter is used. In addition, between two reflection type cutoff filters, since a cut on wavelength of the second cutoff filter on the front side (light source side) is longer than that of the first cutoff filter on the rear side (liquid crystal panel side), a lot of ultraviolet range light beams do not reach the first cutoff filter on the rear side. For this reason, there is an advantage that heat generation in the first cutoff filter on the rear side does not influence a target for irradiation such as the liquid crystal panel.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to drawings. In addition, in figures to be referred to in the following descriptions, a reduced scale is set to be different in each layer or each member in order to make a size of each layer or each member be recognizable in drawings. In addition, in the following description, as a plurality of liquid crystal panels to which light of which a wavelength range is different from each other is supplied, three liquid crystal panels to which red light, green light, and blue light are input are used, and wavelength ranges to which the red light, the green light, and the blue light correspond, respectively, are 620 nm to 740 nm, 500 nm to 570 nm, and 430 nm to 500 nm. In addition, in the following descriptions, the descriptions will be made by setting an liquid crystal panel to a liquid crystal panel 100 when describing a common configuration or the like, and when each configuration of a plurality of the liquid crystal panels 100 is described, it is set to a liquid crystal panel 100R for red color, a liquid crystal panel 100G for green color, and a liquid crystal panel 100B for blue color, and R (for red color), G (for green color), and B (for blue color) will be attached according to a wavelength range of light which is modulated.

First Embodiment

Configuration Example of Projection Type Display Apparatus

Figure 1A:
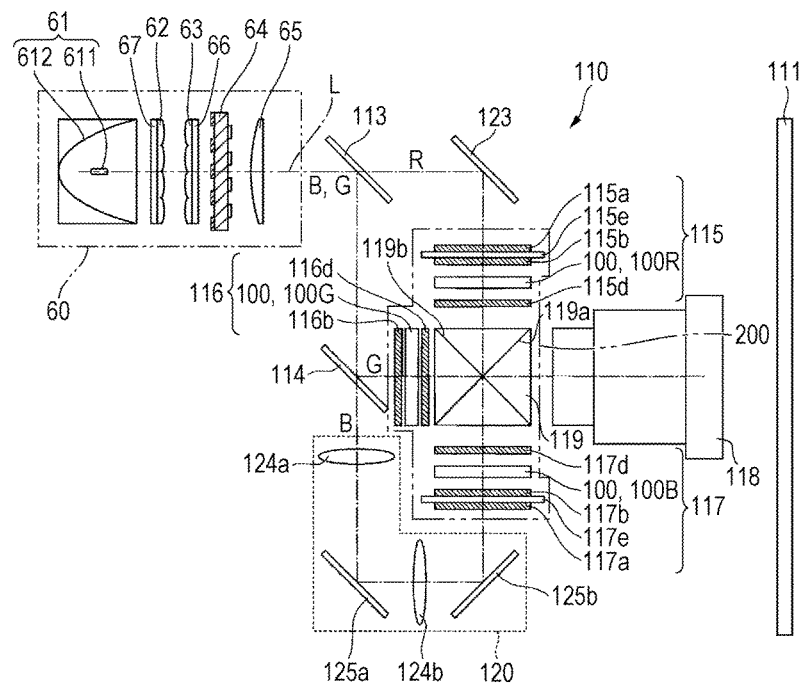
FIGS. 1A and 1B are schematic configuration diagrams of a projection type display apparatus according to a first embodiment of the invention.
Figure 1B:
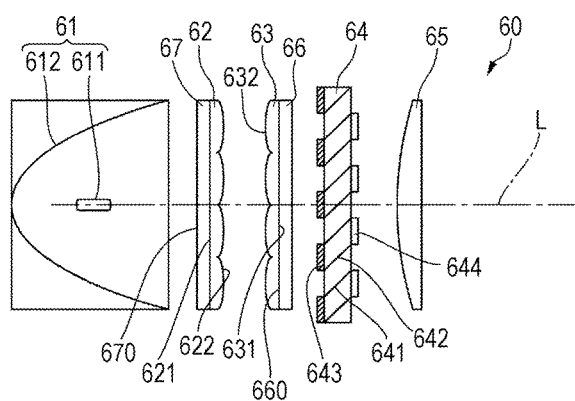

FIGS. 1A and 1B are schematic configuration diagrams of a projection type display apparatus 110 according to the first embodiment of the invention. FIG. 1A is a schematic configuration diagram of the whole projection type display apparatus 110, and FIG. 1B is a schematic configuration diagram of a lighting device 60 which is used in the projection type display apparatus 110.

The projection type display apparatus 110 which is illustrated in FIGS. 1A and 1B is a liquid crystal projector using a transmission type liquid crystal panel 100, radiates light to a projected member 111 which is formed of a screen or the like, and displays an image. The projection type display apparatus 110 includes a lighting device 60, a plurality of liquid crystal panels 100 (liquid crystal light bulbs 115 to 117) to which light output from the lighting device 60 is supplied, a cross dichroic prism 119 (light combining optical system) which combines light beams output from the plurality of liquid crystal panels 100, and outputs the light, and a projection optical system 118 which projects the light which is combined using the cross dichroic prism 119 along an apparatus optical axis L. In addition, the projection type display apparatus 110 includes dichroic mirrors 113 and 114, and a relay system 120. In the projection type display apparatus 110, the liquid crystal panel 100 and the dichroic prism 119 configures an optical unit 200.

In the lighting device 60, a light source unit 61, a first integrator lens 62 which is formed of a lens array such as a fly-eye lens, a second integrator lens 63 which is formed of a lens array such as the fly-eye lens, a polarizing conversion element 64, and a condenser lens 65 are arranged in order along the apparatus optical axis L.

The light source unit 61 includes a light source 611 which outputs white light including red light R, green light G, and blue light B, and a reflector 612. The light source 611 is configured of a extra-high pressure mercury lamp or the like, and the reflector 612 has a parabolic cross section.

The first integrator lens 62 and the second integrator lens 63 uniformize illumination distribution of light which is output from the light source unit 61. The polarizing conversion element 64 makes the light which is output from the light source unit 61 polarized light with a specific vibration direction such as s-polarized light, for example. More specifically, the polarizing conversion element 64 includes a polarizing separation film 641 which is formed of a dielectric multilayered film, and a reflecting face 642, and in which the polarizing separation film 641 reflects s-polarized light, and transmits p-polarized light. A light shielding layer 643 is provided at a portion other than an input port to the polarizing separation film 641 in faces on the input side in the polarizing conversion element 64. In addition, in the face on the output side, a half wave plate 644 is arranged in an output port of light which penetrates the polarizing separation film 641. A polarizing conversion cell is configured of the polarizing separation film 641, the reflecting plate 642, the light shielding layer 643, and the half wave plate 644, and the polarizing conversion element 64 is configured when the polarizing conversion cell is arranged corresponding to a lens cell column of the second integrator lens 63.

The dichroic mirror 113 transmits red light R which is included in the light which is output from the lighting device 60, and reflects the green light G and the blue light B. The dichroic mirror 114 transmits the blue light B, and reflects the green light G which are reflected on the dichroic mirror 113. In this manner, the dichroic mirrors 113 and 114 configure a color separation optical system which separates the light which is output from the lighting device 60 into the red light R, the green light G, and the blue light B.

The liquid crystal light bulb 115 is a transmission type liquid crystal device which modulates the red light R which penetrates the dichroic mirror 113, and is reflected on the reflecting mirror 123 according to an image signal. The liquid crystal light bulb 115 includes a λ/2 retardation plate 115a, a first polarizing plate 115b, the liquid crystal panel 100 (liquid crystal panel for red color 100R), and a second polarizing plate 115d. Here, the red light R which is input to the liquid crystal light bulb 115 remains as s-polarized light since polarized light of the light is not changed even when penetrating the dichroic mirror 113.

The λ/2 retardation plate 115a is an optical element which converts the s-polarized light which is input to the liquid crystal light bulb 115 into p-polarized light. The first polarizing plate 115b is a polarizing plate which blocks out s-polarized light, and transmits p-polarized light. The liquid crystal panel 100 (liquid crystal panel for red color 100R) is configured so as to convert p-polarized light into s-polarized light (circular polarized light or elliptical polarized light when half tone) using modulation corresponding to an image signal. The second polarizing plate 115d is a polarizing plate which transmits s-polarized light by blocking out p-polarized light. Accordingly, the liquid crystal light bulb 115 modulates the red light R according to an image signal, and outputs the modulated red light R toward the cross dichroic prism 119. The λ/2 retardation plate 115a and the first polarizing plate 115b are arranged in a state of being in contact with a translucent glass plate 115e which does not causes polarized light to be converted, and can prevent the λ/2 retardation plate 115a and the first polarizing plate 115b from being warped due to heat generation.

A liquid crystal light bulb 116 is a transmission type liquid crystal device which modulates the green light G which is reflected on the dichroic mirror 114 after being reflected on the dichroic mirror 113 according to an image signal. The liquid crystal light bulb 116 includes a first polarizing plate 116b, the liquid crystal panel 100 (liquid crystal panel 100G for green light), and a second polarizing plate 116d, similarly to the liquid crystal light bulb 115. The green light G which is input to the liquid crystal light bulb 116 is s-polarized light which is input after being reflected on the dichroic mirrors 113 and 114. The first polarizing plate 116b is a polarizing plate which blocks out p-polarized light, and transmits s-polarized light. The liquid crystal panel 100 (liquid crystal panel 100G for green light) is configured so as to convert s-polarized light into p-polarized light (circular polarized light or oval polarized light when being half tone) using modulation corresponding to an image signal. The second polarizing plate 116d is a polarizing plate which blocks out s-polarized light, and transmits p-polarized light. Accordingly, the liquid crystal light bulb 116 modulates the green light G according to the image signal, and outputs the modulated green light G toward the cross dichroic prism 119.

A liquid crystal light bulb 117 is a transmission type liquid crystal device which modulates the blue light B which is reflected on the dichroic mirror 113, transmits the dichroic mirror 114, and then passes through the relay system 120 according to an image signal. The liquid crystal light bulb 117 includes a λ/2 retardation plate 117a, a first polarizing plate 117b, the liquid crystal panel 100 (liquid crystal panel for blue light 100B), and a second polarizing plate 117d, similarly to the liquid crystal light bulbs 115 and 116. The blue light B which is input to the liquid crystal light bulb 117 becomes s-polarized light since the light is reflected on the dichroic mirror 113, and is reflected on two reflecting mirrors 125a and 125b of the relay system 120 after penetrating the dichroic mirror 114.

The λ/2 retardation plate 117a is an optical element which converts s-polarized light which is input to the liquid crystal light bulb 117 into p-polarized light. The first polarizing plate 117b is a polarizing plate which blocks out s-polarized light, and transmits p-polarized light. The liquid crystal panel 100 (liquid crystal panel 100B of blue light) is configured so as to convert p-polarized light into s-polarized light (circular polarized light or oval polarized light when being half tone) using modulation corresponding to an image signal. The second polarizing plate 117d is a polarizing plate which blocks out p-polarized light, and transmits s-polarized light. Accordingly, the liquid crystal light bulb 117 modulates the blue light B according to the image signal, and outputs the modulated blue light B toward the cross dichroic prism 119. In addition, the λ/2 retardation plate 117a and the first polarizing plate 117b are arranged in a state of being in contact with a glass plate 117e.

The relay system 120 includes relay lenses 124a and 124b, and reflecting mirrors 125a and 125b. The relay lenses 124a and 124b are provided in order to prevent an optical loss due to a long optical path of the blue light B. The relay lens 124a is arranged between the dichroic mirror 114 and the reflecting mirror 125a. The relay lens 124b is arranged between the reflecting mirrors 125a and 125b. The reflecting mirror 125a reflects the blue light B which is output from the relay lens 124a after penetrating the dichroic mirror 114 toward the relay lens 124b. The reflecting mirror 125b reflects the blue light B which is output from the relay lens 124b toward the liquid crystal light bulb 117.

The cross dichroic prism 119 is a color combining optical system in which two dichroic films 119a and 119b are orthogonally arranged in an X shape. The dichroic film 119a is a film which reflects the blue light B and transmits the green light G, and the dichroic film 119b is a film which reflects red light R and transmits green light G. Accordingly, the cross dichroic prism 119 combines the red light R, the green light G, and the blue light B which are modulated in the respective liquid crystal light bulb 115 to 117, and outputs the light toward the projection optical system 118.

In addition, light which is input to the cross dichroic prism 119 from the liquid crystal light bulbs 115 and 117 is s-polarized light, and light input to the cross dichroic prism 119 from the liquid crystal light bulb 116 is p-polarized light. In this manner, it is possible to combine light beams which are input from each of the liquid crystal light bulbs 115 to 117 in the cross dichroic prism 119 by making light beams input to the cross dichroic prism 119 different polarized light beams. Here, in general, the dichroic films 119a and 119b are excellent in a reflection property of s-polarized light. For this reason, the red light R and blue light B which are reflected on the dichroic films 119a and 119b are set to s-polarized light, and the green light G which penetrates the dichroic films 119a and 119b is set to p-polarized light. The projection optical system 118 includes a projection lens (not illustrated), and projects the light which is combined in the cross dichroic prism 119 onto the projected member 111 such as a screen.

Configuration of Liquid Crystal Panel 100

Figure 2A:
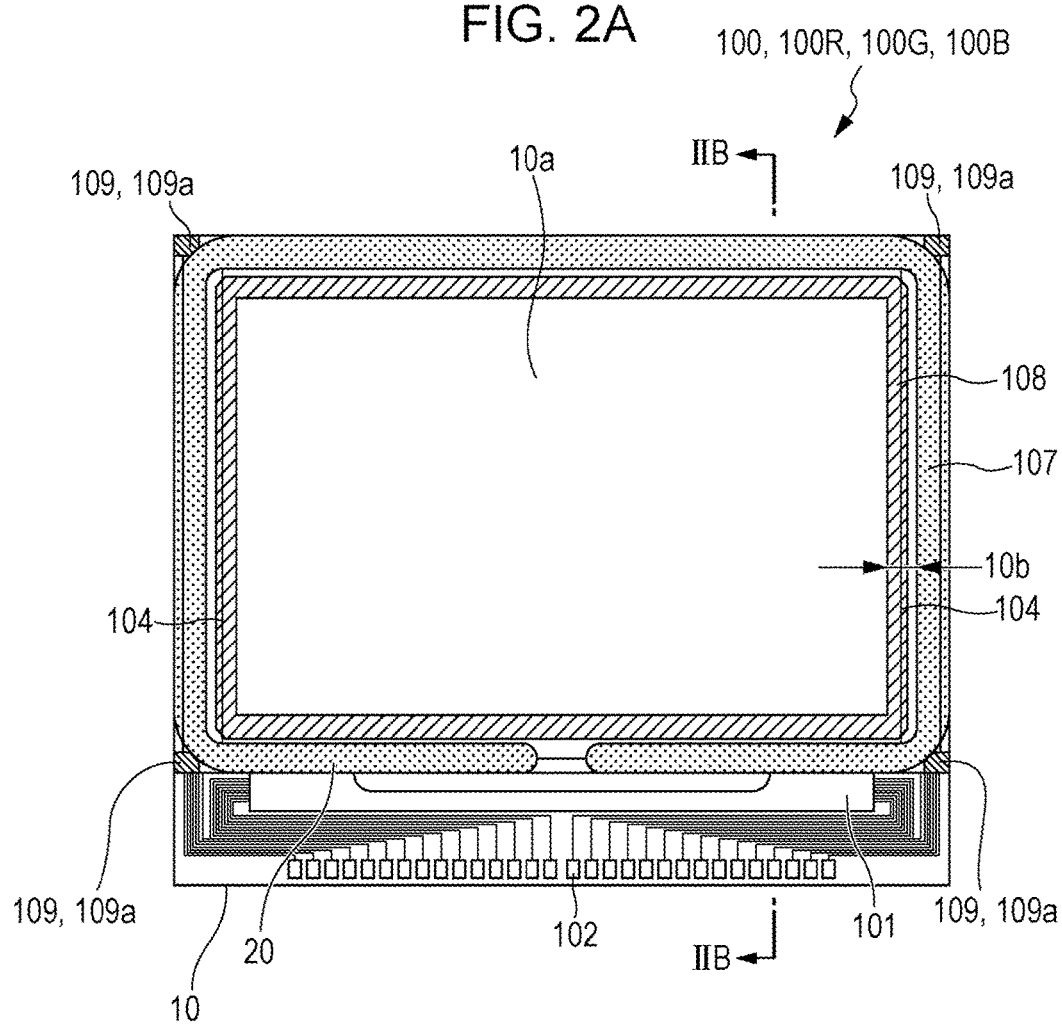
FIGS. 2A and 2B are explanatory diagrams of a liquid crystal panel which is used in the projection type display apparatus according to the first embodiment of the invention.
Figure 2B:
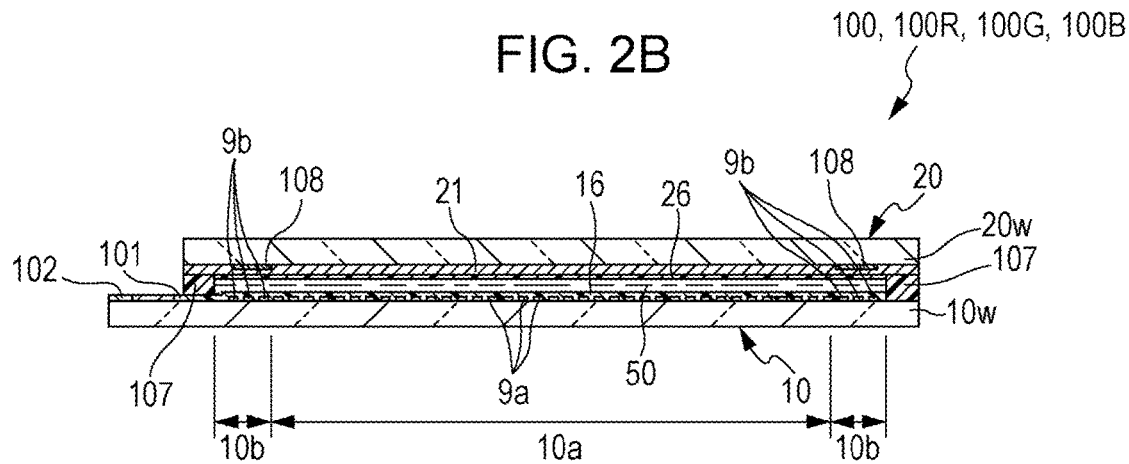

FIGS. 2A and 2B are explanatory diagrams of the liquid crystal panel 100 which is used in the projection type display apparatus 110 according to the first embodiment of the invention. FIG. 2A is a plan view in which the liquid crystal panel 100 is viewed from the second substrate side along with each constituent element, and FIG. 2B is a cross-sectional view which is taken along line IIB-IIB.

As illustrated in FIGS. 2A and 2B, in the liquid crystal panel 100 (liquid crystal panel 100R for red light, liquid crystal panel 100G for green light, and liquid crystal panel 100B for blue light), the first substrate 10 and the second substrate 20 are bonded using a sealing material 107 through a predetermined interval, and the sealing material 107 is provided in a frame shape so as to go along the outer edge of the second substrate 20. The liquid crystal panel 100 is configured as a liquid crystal panel of a twisted nematic (TN) mode, or a liquid crystal panel of a vertical alignment (VA) mode. In the liquid crystal panel 100, the sealing material 107 is an adhesive which is formed of a photocurable resin, a heat curable resin, or the like, and in which a gap material such as glass fiber, glass beads, or the like for setting a distance between both substrates to a predetermined value is contained. In the liquid crystal panel 100 with the configuration, a liquid crystal layer 50 is maintained in a region which is surrounded with the sealing material 107 between the first substrate 10 and the second substrate 20. In the liquid crystal layer 50, a biphenyl-based liquid crystal material, a phenyl cyclohexane-based liquid crystal material, a cyclohexane-based liquid crystal material, a phenylpiperdine-based liquid crystal material, an esther-based liquid crystal material, a dioxane-based liquid crystal material, or the like is used. Here, in the liquid crystal layer 50, there is a case in which a plurality of liquid crystal materials are blended and used in order to satisfy a required performance related to a decrease in driving voltage, heat resistance, viscosity, or the like, in addition to a sole use of the above described liquid crystal material.

According to the embodiment, both of the first and second substrates 10 and 20 have square shapes, and a display region 10a is provided as a square region in approximately a center of the liquid crystal panel 100. The sealing material 107 is also provided in approximately the square shape corresponding to the shape, and a peripheral region 10b in approximately a square shape is provided in a frame shape between the inner peripheral edge of the sealing material 107 and the outer peripheral edge of the display region 10a. In the first substrate 10, a data line driving circuit 101 and a plurality of terminals 102 are formed along one side of the first substrate 10 on the outer side of the display region 10a, and a scanning line driving circuit 104 is formed along the other side which is close to the one side. In addition, a flexible wiring board (not illustrated) is connected to the terminal 102, and various potentials or various signals are input to the first substrate 10 through the flexible wiring board.

On a face of the first substrate 10 on the liquid crystal layer 50 side, a pixel transistor (not illustrated) and pixel electrodes 9a which are electrically connected to the pixel transistor are formed in a matrix in the display region 10a, and a first alignment film 16 is formed on the higher layer side of the pixel electrode 9a. The first alignment film 16 is formed of a resin film such as a polyimid film, or an oblique deposition film such as a silicon oxide film. According to the embodiment, the first alignment film 16 is a first inorganic alignment film which is formed of an oblique deposition film of $SiO_X$ (x<2), $SiO_2$, $TiO_2$, MgO, $Al_2O_3$, $In_2O_3$, $Sb_2O_3$, $Ta_2O_5$, or the like. In addition, dummy pixel electrodes 9b which are simultaneously formed along with the pixel electrodes 9a are formed in the peripheral region 10b on one surface side of the first substrate 10.

A common electrode 21 is formed on a face on the liquid crystal layer 50 side of the second substrate 20, and a second alignment film 26 is formed on the higher layer of the common electrode 21. Similarly to the first alignment film 16, the second alignment film 26 is formed of a resin film such as a polyimid film, or the like, and or an oblique deposition film such as a silicon oxide film. According to the embodiment, the second alignment film 26 is a second organic alignment film which is formed of the oblique deposition film of $SiO_X$ (x<2), $SiO_2$, $TiO_2$, MgO, $Al_2O_2$, $In_2O_3$, $Sb_2O_3$, $Ta_2O_5$, or the like. The first alignment film 16 and the second alignment film 26 cause a nematic liquid crystal compound of which dielectric anisotropy is negative which is used in the liquid crystal layer 50 to be vertically aligned, and cause the liquid crystal panel 100 to be operated in a VA mode of normally black. The common electrode 21 is formed on approximately the entire surface of the second substrate 20. In addition, on the face on the liquid crystal layer 50 side of the second substrate 20, a light shielding layer 108 is formed on the lower layer side of the common electrode 21. According to the embodiment, the light shielding layer 108 is formed in a frame shape which is extended along the outer peripheral edge of the display region 10a, and functions as bordering. The outer peripheral edge of the light shielding layer 108 is located with space between the outer peripheral edge thereof and the inner peripheral edge of the sealing material 107, and the light shielding layer 108 and the sealing material 107 do not overlap with each other.

In addition, there is a case in which, in the second substrate 20, the light shielding layer 108 is also formed in a region which overlaps with a region which is interposed between neighboring pixel electrodes 9a.

In the liquid crystal panel 100 which is configured in this manner, in the first substrate 10, an electrode for electric connection between substrates 109 for an electric connection between the first substrate 10 and the second substrate 20 is formed in a region overlapping with a corner portion of the second substrate 20 on the outer side of the sealing material 107. In the electrode for electric connection between substrates 109, a conduction material between substrates 109a including conduction particles is arranged, and the common electrode 21 of the second substrate 20 is electrically connected to the first substrate 10 side through the conduction material between substrates 109a and the electrode for electric connection between substrates 109. For this reason, a common potential is applied to the common electrode 21 from the first substrate 10 side.

The sealing material 107 is provided along the outer peripheral edge of the second substrate 20 with approximately the same width. For this reason, the sealing material 107 has approximately a square shape. However, the sealing material 107 is provided so as to pass through the inside by avoiding the electrode for electric connection between substrates 109 in a region in which the sealing material overlaps with the corner portion of the second substrate 20, and a corner portion of the sealing material 107 has approximately an arc shape.

In the liquid crystal panel 100 with the configuration, when the pixel electrode 9a and the common electrode 21 are formed using a translucent conductive film such as Indium Tin Oxide (ITO) film or Indium Zinc Oxide (IZO) film, it is possible to configure a transmission type liquid crystal panel 100. In the transmission type liquid crystal panel 100, light which is input from the second substrate 20 side is modulated while penetrating the first substrate 10 and being output. In contrast to this, when the common electrode 21 is formed using a translucent conductive film, and the pixel electrode 9a is formed using a reflective conductive film such as an aluminum film between the pixel electrode 9a and the common electrode 21, for example, and it is possible to configure a reflection type liquid crystal panel 100. In the reflection type liquid crystal panel 100, light which is input from the second substrate 20 side is modulated while being reflected on the first substrate 10 and being output.

Detailed Configuration of Lighting Device 60

Figure 3:
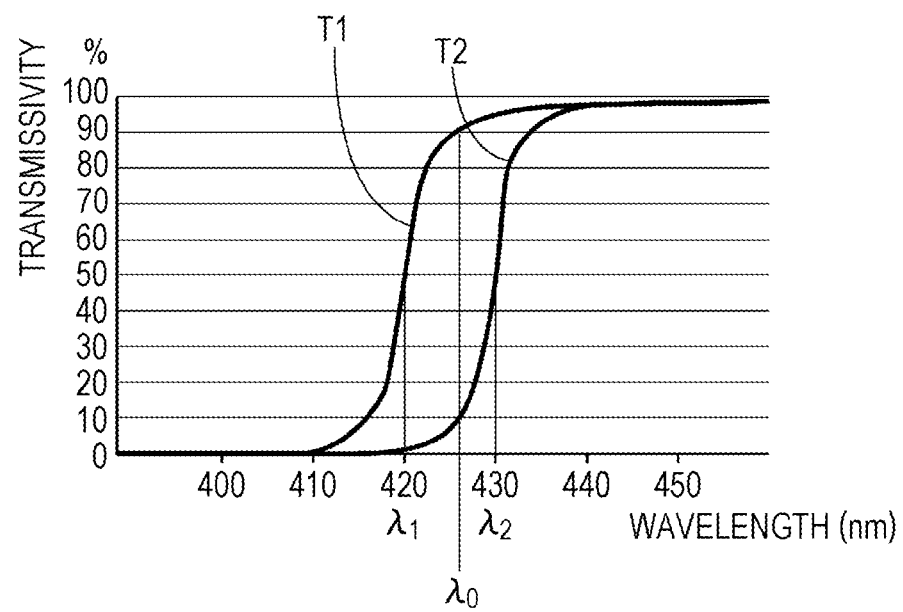
FIG. 3 is an explanatory diagram which illustrates transmission properties of a first cutoff filter and a second cutoff filter which are used in a lighting device of the projection type display apparatus according to the first embodiment of the invention.

FIG. 3 is an explanatory diagram which illustrates transmission properties of the first cutoff filter 66 and the second cutoff filter 67 which are used in a lighting device 60 of the projection type display apparatus 110 according to the first embodiment of the invention.

In the light source unit 61 which is used in the lighting device 60 of the projection type display apparatus 110 which is illustrated in FIGS. 1A and 1B, a lot of ultraviolet range light beams are included in light which is output from the light source 611 formed of an extra-high pressure mercury lamp or the like, and when the ultraviolet range light is input to the liquid crystal panel 100, a liquid crystal material which is used in the liquid crystal layer 50 deteriorates. Therefore, according to the embodiment, the ultraviolet range light of light which is output from the light source 611 is blocked out using the two cutoff filters (first cutoff filter 66 and the second cutoff filter 67), and the light is output toward the liquid crystal panel 100 side. According to the embodiment, the first cutoff filter 66 is a reflection type short wavelength cutoff filter (long path filter) which reflects ultraviolet range light in an optical path from the light source 611 to the liquid crystal panel 100. The second cutoff filter 67 is a reflective short wavelength cutoff filter (long path filter) which reflects ultraviolet-region light on an optical path from the light source 611 to the first cutoff filter 66. The first cutoff filter 66 and the second cutoff filter 67 are configured using a dielectric multilayered film in which a high refractive index layer and a low refractive index layer are alternately stacked. As a material of the high refractive index layer, $TiO_2$ (n=2.4), $Ta_2O_5$ (n=2.1), $Nb_2O_5$ (n=2.2), or the like is used, and as a material of the low refractive index layer, $SiO_2$ (n=1.46), or $MgF_2$ (n=1.38) is used. A refractive index n is different depending on a wavelength, and the above described refractive index n has a value of wavelength 500 nm.

Here, an input face of at least one of the first cutoff filter 66 and second cutoff filter 67 is orthogonal to the apparatus optical axis L which reaches the liquid crystal panel 100 from the light source 611.

According to the embodiment, both an input face 660 of the first cutoff filter 66 and an input face 670 of the second cutoff filter 67 are orthogonal to the apparatus optical axis L.

In this manner, according to the embodiment, as will be described later, when providing the first cutoff filter 66 and the second cutoff filter 67, at least one of the first cutoff filter 66 and second cutoff filter 67 is provided on a planar-shaped first face which is included in the optical element which is arranged on the optical path from the light source 611 to the liquid crystal panel 100, on the input face side or the output face side.

According to the embodiment, as illustrated in FIG. 1B, the second integrator lens 63 is arranged on the optical path from the light source 611 to the liquid crystal panel 100. In the second integrator lens 63, a first face 631 on the side opposite to the light source 611 is formed in a planar shape, and a second face 632 on the light source 611 side has a plurality of curved faces which configures the lens. In addition, the first face 631 of the second integrator lens 63 is orthogonal to the apparatus optical axis L. Therefore, the dielectric multilayered film is formed with respect to the first face 631 of the second integrator lens 63, and the first cutoff filter 66 is formed due to the dielectric multilayered film. In addition, the second integrator lens 63 arranges the planar-shaped first face 631 so as to face the light source 611 side; however, also in this case, the first cutoff filter 66 is formed on the planar-shaped first face 631.

In addition, on the optical path from the light source 611 to the liquid crystal panel 100, the first integrator lens 62 is arranged between the light source 611 and the second integrator lens 63.

In the first integrator lens 62, a first face 621 on the light source 611 side has a planar shape, and a second face 622 on the opposite side of the light source 611 has a plurality of curved faces which configure the lens. In addition, the first face 621 of the first integrator lens 62 is orthogonal to the apparatus optical axis L. Therefore, the dielectric multilayered film is formed with respect to the first face 621 of the first integrator lens 62, and the second cutoff filter 67 is configured due to the dielectric multilayered film. In addition, the first integrator lens 62 arranges the planar-shaped first face 621 so as to face the side opposite to the light source 611; however, also in this case, the second cutoff filter 67 is formed on the planar-shaped first face 621.

Here, the first cutoff filter 66 has a transmission property which is denoted by the solid line T1 in FIG. 3, the second cutoff filter 67 has a transmission property which is denoted by the solid line T2 in FIG. 3, and the second cutoff filter 67 is a long wavelength compared to the first cutoff filter 66 of which transmissivity of a cut on wavelength is 50%. For example, the cut on wavelength of the first cutoff filter 66 $\lambda_1$ is 420 nm, and transmissivity in wavelength of 410 nm is equal to or less than 0.1%. In contrast to this, the cut on wavelength of the second cutoff filter 67 $\lambda_2$ is 430 nm, and transmissivity in wavelength of 420 nm is equal to or less than 0.1%.

In addition, the cut on wavelength $\lambda_1$ of the first cutoff filter 66 is located at a cutoff wavelength region of which transmissivity is equal to or less than 0.1% in the second cutoff filter 67. In addition, in the wavelength $\lambda_0$ of which transmissivity is 10% in the second cutoff filter 67, transmissivity of the first cutoff filter 66 is equal to or more than 90%. For example, the wavelength $\lambda_0$ of which transmissivity is 10% in the second cutoff filter 67 is appropriately 426 nm, and in the wavelength $\lambda_0$, transmissivity of the first cutoff filter 66 is 90%. In addition, transmissivity in the wavelength of 430 nm of the first cutoff filter 66 is appropriately 95%.

Main Effect of Embodiment

As described above, in the projection type display apparatus 110 according to the embodiment, the first cutoff filter 66 and the second cutoff filter 67 which block out ultraviolet range light are arranged on the optical path from the light source 611 to the liquid crystal panel 100, in the lighting device 60. For this reason, ultraviolet range light of light which is output from the light source 611 is blocked out using the first cutoff filter 66 and the second cutoff filter 67, and the light is supplied to the liquid crystal panel 100 thereafter. For this reason, it is possible to prevent the liquid crystal layer 50 from being deteriorated due to the ultraviolet range light.

More specifically, when a liquid crystal material including a segment such as an aromatic ring in a molecule is used in the liquid crystal layer 50, light absorption in which a peak wavelength is 250 nm to 300 nm is obtained. For this reason, when light in ultraviolet range or near ultraviolet range is input to the liquid crystal layer 50, the above described segment is in a photoexcited state according to a transition moment of the liquid crystal molecule and a direction of an electric field vector of radiation light. As a result, various ionic impurities are generated from the liquid crystal material due to a photochemical reaction, a display quality deteriorates, and a life in light resistance is shortened. However, according to the embodiment, since ultraviolet range light of light which is output from the light source 611 is blocked out using the first cutoff filter 66 and the second cutoff filter 67, and the light is supplied to the liquid crystal panel 100, it is possible to suppress the above described shortening of life in light resistance.

Here, the cut on wavelength $\lambda_1$ of the first cutoff filter 66 and the cut on wavelength $\lambda_2$ of the second cutoff filter 67 are different from each other. In addition, the cut on wavelength $\lambda_1$ of the first cutoff filter 66 is located in a cutoff wavelength region of which transmissivity is equal to or less than 0.1% in the second cutoff filter 67. For this reason, it is possible to sufficiently block out ultraviolet range light without remarkably reducing transmissivity of visible range light. That is, according to the first cutoff filter 66 and the second cutoff filter 67, it is possible to set transmissivity in a wavelength of 420 nm to be equal to or less than 0.1%×50%=0.05%, and also in this case, it is possible to set transmissivity in a wavelength of 430 nm to 95%×50%=47.5%. For this reason, it is possible to secure sufficiently high intensity of the blue light B, and to sufficiently block out ultraviolet range light.

In contrast to this, when using two translucent cutoff filters which are denoted by the solid line T2 in FIG. 3, transmissivity in a wavelength of 420 nm becomes equal to or less than 0.1%×0.1%=0.01%; however, transmissivity in a wavelength of 430 nm is reduced to 50%×50%=25%, and it is not possible to sufficiently secure intensity of the blue light B.

In addition, in the wavelength $\lambda_0$ which transmissivity is 10% in the second cutoff filter 67, transmissivity of the first cutoff filter 66 is equal to or more than 90%. Accordingly, also in the case in which two cutoff filters (first cutoff filter 66 and second cutoff filter 67) are used, an influence of visible range light on a spectrum is small compared to the case in which only the second cutoff filter 67 is used.

In addition, according to the embodiment, both of the first cutoff filter 66 and the second cutoff filter 67 are reflection type cutoff filters, and it is possible to suppress heat generation in the cutoff filter to be low compared to a case in which an absorption type cutoff filter is used. For this reason, heat generation in the first cutoff filter 66 and the second cutoff filter 67 hardly influences the liquid crystal panel 100 or the optical element which is arranged in the vicinity.

In addition, both of the first cutoff filter 66 and second cutoff filter 67 are reflection type cutoff filters, and in a dielectric multilayered film which configures two cutoff filters, it is possible to adopt a configuration in which a basic layer configuration is the same, and only the film thickness of each layer is different. Accordingly, in the first cutoff filter 66 and the second cutoff filter 67, transmission spectra in a wide wavelength range approximately match. Accordingly, since a spectrum of visible range light which reaches the liquid crystal panel 100 is not remarkably changed compared to a case in which one cutoff filter is used, it is possible to obtain good contrast over a wide wavelength range.

In addition, between two reflection type cutoff filters, since the cut on wavelength of the second cutoff filter 67 on the front side (light source 611 side) is longer than that of the first cutoff filter 66 on the rear side (liquid crystal panel 100 side), a lot of ultraviolet range light beams do not reach the first cutoff filter 66 on the rear side. For this reason, there is an advantage that heat generation in the first cutoff filter 66 on the rear side does not influence the liquid crystal panel 100 or an optical element which is arranged in the vicinity.

In addition, the first cutoff filter 66 is formed on the planar-shaped first face 631 of the second integrator lens 63, and the second cutoff filter 67 is formed on the planar-shaped first face 621 of the first integrator lens 62. For this reason, both the input face 660 of the first cutoff filter 66 and the input face 670 of the second cutoff filter 67 are orthogonal to the apparatus optical axis L. Accordingly, even in the case in which the reflection type cutoff filter is used in the first cutoff filter 66 and the second cutoff filter 67, the input angle hardly influences on a cutoff property. In addition, since it is a configuration in which the first cutoff filter 66 and the second cutoff filter 67 are added to the optical element (first integrator lens 62 and second integrator lens 63), the number of optical elements is not increased even when the cutoff filter is provided. In addition, since unnecessary interface reflection is reduced by the number of optical elements which is not increased, it is possible to cause light from the light source 611 to reach the liquid crystal panel 100 efficiently.

In addition, in the liquid crystal panel 100, since both the first alignment film 16 and the second alignment film 26 which are formed on the first substrate 10 and the second substrate 20 are inorganic alignment films, it is possible to suppress deterioration of the alignment film due to ultraviolet range light, compared to a case in which an organic alignment film is used.

Second Embodiment

Figure 4:
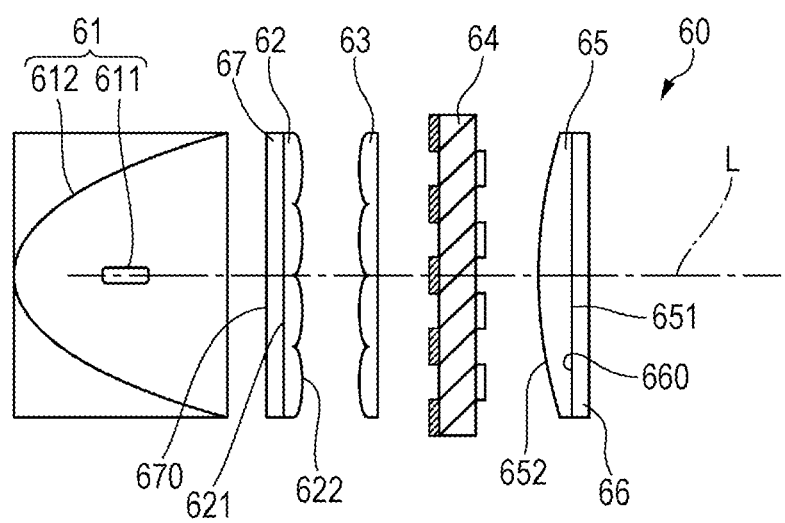
FIG. 4 is a schematic configuration diagram of a lighting device which is used in a projection type display apparatus according to a second embodiment of the invention.

FIG. 4 is a schematic configuration diagram of the lighting device 60 which is used in a projection type display apparatus 110 according to a second embodiment of the invention. In addition, since basic configurations of the embodiment and third and fourth embodiments which will be described later are the same as those in the first embodiment, common portions are given the same reference numerals, and descriptions thereof will be omitted.

According to the first embodiment, the first cutoff filter 66 is formed on the planar-shaped first face 631 of the second integrator lens 63, and the second cutoff filter 67 is formed on the planar-shaped first face 621 of the first integrator lens 62. In contrast to this, according to the embodiment, as illustrated in FIG. 4, a condenser lens 65 (optical element) is arranged on the optical path from the light source 611 to the liquid crystal panel 100. In the condenser lens 65, a first face 651 on the side opposite to the light source 611 has a planar shape, and a second face 652 on the light source 611 side has a curved face which forms the lens. In addition, the first face 651 of the condenser lens 65 is orthogonal to the apparatus optical axis L. Therefore, a dielectric multilayered film is formed with respect to the planar-shaped first face 651 of the condenser lens 65, and the first cutoff filter 66 is configured due to the dielectric multilayered film. In addition, the condenser lens 65 is arranged so that the planar-shaped first face 651 faces the light source 611 side; however, also in this case, the first cutoff filter 66 is formed on the planar-shaped first face 651.

In addition, according to the embodiment, a dielectric multilayered film is formed with respect to the planar-shaped first face 621 of the first integrator lens 62, and the second cutoff filter 67 is configured due to the dielectric multilayered film. In addition, the first integrator lens 62 is arranged so that the planar-shaped first face 621 faces the side opposite to the light source 611; however, also in this case, the second cutoff filter 67 is formed on the planar-shaped first face 621. Also in such a configuration, the same effect as that in the first embodiment is exerted.

Third Embodiment

Figure 5:
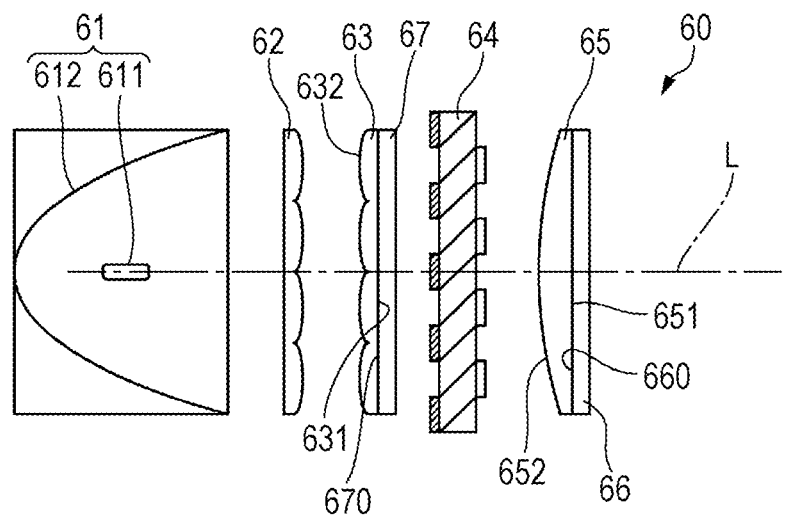
FIG. 5 is a schematic configuration diagram of the lighting device which is used in the projection type display apparatus according to the second embodiment of the invention.

FIG. 5 is a schematic configuration diagram of a lighting device 60 which is used in a projection type display apparatus 110 according to a third embodiment of the invention. According to the embodiment, as illustrated in FIG. 5, a dielectric multilayered film is formed with respect to the planar-shaped first face 651 of the condenser lens 65, and the first cutoff filter 66 is formed due to the dielectric multilayered film. In addition, the condenser lens 65 is arranged so that the planar-shaped first face 651 faces the light source 611 side; however, also in this case, the first cutoff filter 66 is formed on the planar-shaped first face 651.

In addition, according to the embodiment, a dielectric multilayered film is formed with respect to the planar-shaped first face 631 of the second integrator lens 63, and the second cutoff filter 67 is configured due to the dielectric multilayered film. In addition, the second integrator lens 63 is arranged so that the planar-shaped first face 631 faces the light source 611 side; however, also in this case, the second cutoff filter 67 is formed on the planar-shaped first face 631. Also in such a configuration, the same effect as that in the first embodiment is exerted.

Fourth Embodiment

Figure 6:
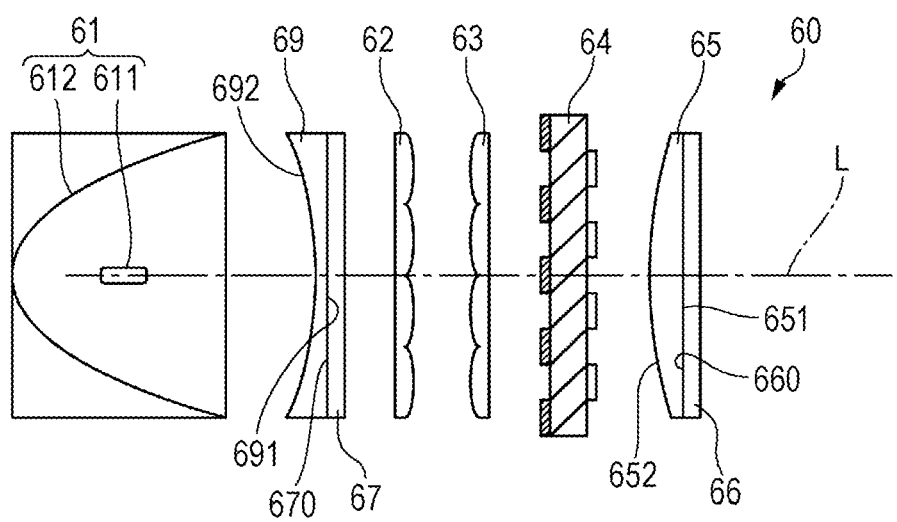
FIG. 6 is a schematic configuration diagram of the lighting device which is used in the projection type display apparatus according to the second embodiment of the invention.

FIG. 6 is a schematic configuration diagram of a lighting device 60 which is used in a projection type display apparatus 110 according to a fourth embodiment of the invention. According to the embodiment, as illustrated in FIG. 6, since a reflector 612 has an elliptical cross section, a concave lens 69 (optical element) is arranged between the light source unit 61 and the first integrator lens 62. In the concave lens 69, a first face 691 on the side opposite to the light source 611 is formed in a planar shape, and a second face 692 on the light source 611 side is formed in a curved shape which configures the lens. In addition, the first face 691 of the concave lens 69 is orthogonal to the apparatus optical axis L. Therefore, a dielectric multilayered film is formed with respect to the planar-shaped first face 691 of the concave lens 69, and the second cutoff filter 67 is configured due to the dielectric multilayered film. In addition, the concave lens 69 is arranged so that the planar-shaped first face 691 faces the light source 611 side; however, also in this case, the second cutoff filter 67 is formed on the planar-shaped first face 691.

In addition, in the first cutoff filter 66, a dielectric multilayered film is formed with respect to the planar-shaped first face 651 of the condenser lens 65, for example, and the first cutoff filter 66 is configured due to the dielectric multilayered film. Also in such a configuration, the same effect as that in the first embodiment is exerted.

Other Embodiment

In the above described embodiment, the example in which the transmission type liquid crystal panel 100 is used has been described; however, the invention may be applied to a projection type display apparatus in which a reflection type liquid crystal panel 100 is used.

In the above described embodiment, the first cutoff filter 66 and the second cutoff filter 67 are arranged on a common optical path with respect to three liquid crystal panels 100 of red light R, green light G, and blue light B; however, one of or both the first cutoff filter 66 and the second cutoff filter 67 may be arranged on an optical path of the liquid crystal panel 100 of blue light B.

In the above described embodiment, the example in which the three liquid crystal panels 100 of red light R, green light G, and blue light B are used has been described; however, the embodiment may be applied to a case in which two liquid crystal panels 100, or four or more liquid crystal panels 100 corresponding to different colors are used.

The entire disclosure of Japanese Patent Application No. 2014-004893, filed Jan. 15, 2014 is expressly incorporated by reference herein.

What is claimed is:
1. A projection type display apparatus comprising:
a light source;
a liquid crystal panel which includes a liquid crystal layer between a first substrate and a second substrate, and modulates light which is output from the light source;
a projection optical system which projects the modulated light which is output from the liquid crystal panel;
a first cutoff filter which reflects ultraviolet range light and is arranged between the light source and the liquid crystal panel; and a second cutoff filter which reflects the ultraviolet range light, is arranged between the light source and the first cutoff filter, and has a cut on wavelength longer than that of the first cutoff filter, wherein transmissivity of the first cutoff filter is equal to or more than 90% when light with a wavelength of which transmissivity of the second cutoff filter is 10% is radiated to the first cutoff filter.

2. The projection type display apparatus according to claim 1, wherein an input face of at least one of the first cutoff filter and the second cutoff filter is orthogonal to an apparatus optical axis which reaches the liquid crystal panel from the light source.

3. The projection type display apparatus according to claim 1, wherein at least one of the first cutoff filter and the second cutoff filter is provided with an optical element on the input face side or an output face side.

4. The projection type display apparatus according to claim 3, wherein the optical element has a curved face.

5. The projection type display apparatus according to claim 1, wherein the transmissivity of the second cutoff filter is equal to or less than 0.1% when light with a cut on wavelength of which transmissivity of the first cutoff filter is 50% is radiated to the second cutoff filter.

6. The projection type display apparatus according to claim 1, wherein the liquid crystal panel includes a first inorganic alignment film which is formed on a liquid crystal panel side of the first substrate, and a second inorganic alignment film which is formed on a liquid crystal panel side of the second substrate.

7. The projection type display apparatus according to claim 1, wherein the first cutoff filter and the second cutoff filter are formed of dielectric multilayered films.

8. A lighting device comprising:

a light source;

a first cutoff filter which reflects ultraviolet light and is arranged on an output optical path from the light source; and a second cutoff filter which reflects the ultraviolet range light, is arranged between the light source and the first cutoff filter, and has a cut on wavelength longer than that of the first cutoff filter, wherein transmissivity of the first cutoff filter is equal to or more than 90% when light with a wavelength of which transmissivity of the second cutoff filter is 10% is radiated to the first cutoff filter.

9. A projection type display apparatus comprising:

a light source;

a liquid crystal panel which includes a liquid crystal layer between a first substrate and a second substrate, and modulates light which is output from the light source;

a projection optical system which projects the modulated light which is output from the liquid crystal panel;

a first cutoff filter which reflects ultraviolet range light and is arranged between the light source and the liquid crystal panel; and a second cutoff filter which reflects the ultraviolet range light, is arranged between the light source and the first cutoff filter, and has a cut on wavelength longer than that of the first cutoff filter, wherein the transmissivity of the second cutoff filter is equal to or less than 0.1% when light with a cut on wavelength of which transmissivity of the first cutoff filter is 50% is radiated to the second cutoff filter.

* * * * *